United States Patent
Su et al.

(10) Patent No.: US 11,242,107 B2
(45) Date of Patent: Feb. 8, 2022

(54) ELECTRIC MOTORCYCLE WITH IMPROVED MOTOR EFFICIENCY

(71) Applicants: Kuo-Hsin Su, New Taipei (TW); Ta-Yu Su, New Taipei (TW)

(72) Inventors: Kuo-Hsin Su, New Taipei (TW); Ta-Yu Su, New Taipei (TW)

( * ) Notice: Subject to any disclaimer, the term of this patent is extended or adjusted under 35 U.S.C. 154(b) by 167 days.

(21) Appl. No.: 16/580,064

(22) Filed: Sep. 24, 2019

(65) Prior Publication Data

US 2021/0086858 A1    Mar. 25, 2021

(51) Int. Cl.
| | | |
|---|---|---|
| *B62K 11/04* | (2006.01) | |
| *B62M 9/06* | (2006.01) | |
| *B62M 25/06* | (2006.01) | |
| *B62M 7/04* | (2006.01) | |
| *F16H 57/02* | (2012.01) | |
| *F16H 1/20* | (2006.01) | |
| *B60L 50/60* | (2019.01) | |

(52) U.S. Cl.
CPC .............. *B62K 11/04* (2013.01); *B60L 50/60* (2019.02); *B62M 7/04* (2013.01); *B62M 9/06* (2013.01); *B62M 25/06* (2013.01); *F16H 1/20* (2013.01); *F16H 57/02* (2013.01); *B60L 2200/12* (2013.01); *B62K 2204/00* (2013.01); *F16H 2057/02065* (2013.01); *F16H 2200/0013* (2013.01)

(58) Field of Classification Search
CPC .... B62K 23/08; B62K 2204/00; B62M 25/06; B60K 17/352; B60K 17/00; B60K 17/06; B60K 17/08
See application file for complete search history.

(56) References Cited

U.S. PATENT DOCUMENTS

| | | | | |
|---|---|---|---|---|
| 10,189,543 | B2* | 1/2019 | Su | B60K 1/04 |
| 2012/0296508 | A1* | 11/2012 | Mazzini | B62K 23/06 |
| | | | | 701/22 |
| 2015/0329011 | A1* | 11/2015 | Kawai | B60L 50/51 |
| | | | | 701/22 |
| 2019/0264803 | A1* | 8/2019 | Matsukawa | F16H 61/12 |
| 2019/0337382 | A1* | 11/2019 | Yu | B60K 7/0007 |
| 2020/0158188 | A1* | 5/2020 | Kajihara | F16D 25/08 |

* cited by examiner

*Primary Examiner* — Tony H Winner
(74) *Attorney, Agent, or Firm* — Rosenberg, Klein & Lee (57) ABSTRACT

An electric motorcycle includes a transmission gear set mounted in a gearbox housing and having a power input shaft inserted through a middle block of the gearbox and a power input pulley mounted on the power input shaft, an electric motor mounted on one side of the middle block and having a motor pulley mounted on the motor shaft thereof, and a transmission belt coupled between the motor pulley and the power input pulley for enabling the electric motor to rotate the power input shaft of the transmission gear set through the transmission belt, a gear shift pedal and a gear shift axle for gear shifting, and a speed output chain gear mounted on an output shaft of the transmission gear set and driven by the output shaft to rotate the rear wheel of the electric motorcycle through a chain.

9 Claims, 7 Drawing Sheets

ELECTRIC MOTORCYCLE WITH IMPROVED MOTOR EFFICIENCY

BACKGROUND OF THE INVENTION

1. Field of the Invention

The present invention relates to motorcycle technology and more particularly, to an electric motorcycle, which directly uses the gearbox of a used or new fuel engine-based vehicle for power transmission, and an electric motor for driving the gearbox so that, subject to the optimal power transmission performance of the gearbox, the electric motor is capable of producing the most appropriate driving speed in the starting state or any of a variety of travelling state, achieving optimal output efficiency and significantly reducing power consumption and enhancing endurance.

2. Description of the Related Art

U.S. patent application Ser. No. 15/227,063, which was allowed on Jan. 29, 2019 under U.S. Pat. No. 10,189,543 B2, discloses an electric motorcycle, which directly uses a gearbox of a used or new fuel engine-based vehicle for power transmission, and an electric motor for driving the gearbox so that, subject to the optimal power transmission performance of the gearbox, the electric motor is capable of producing the most appropriate driving speed in the starting state or any of a variety of travelling state, achieving optimal output efficiency and significantly reducing power consumption and enhancing endurance.

In the patent application Ser. No. 15/227,063, the applicant has already mentioned that conventional electric cars are unable to replace fuel vehicles in market sales due to the performance of electric vehicles is still unable to meet the practical needs of consumers and the drawbacks of lack of endurance, long charging time, starting torque shortage and high cost. The fastest and effective way is to change the drive mode of the motor. The drive modes of currently commercial electric vehicles can be divided into: (1) direct drive, (2) a reduction gear drive, and (3) belt type CVT (continuously variable transmission) drive.

(1) Direct drive: This drive mode is widely used in electric vehicles for the advantages of simple structure, no complex transmission system and low-cost, however, this mode shows the largest drop in the actual use. When a low horsepower motor is used, it consumes less electricity, and can easily be controlled during the period from startup to low speed. However, in the actual situation of urban driving, the electric vehicle must be frequently stopped and driven to move forwards. Due to the use of low horsepower motor, the start time is relatively prolonged, and the motor will draw a large amount of battery power from the battery in the initial stage in order to overcome inertia. During this period, the gear shift position cannot be changed to increase torque output, reducing the cruising range of the electric vehicle. Increasing the horsepower of the motor can improve the aforesaid problem; however, it will also increase electricity consumption and the risk of red burst in the vehicle initial stage, making the driver difficult to manipulate normal driving.

(2) Reduction gear drive: This mode improves the performance during the stage from startup to low speed by using a high-speed motor to match a reduction gear; however, due to the limitation of fixed gear ration, this drive mode cannot meet high-speed and low-speed driving needs at the same time (when an electric vehicle is running at a high speed, the driver can simply increase the rotating speed of the motor, however, increasing the rotating speed of the motor will simultaneously produce high temperature, increasing electricity consumption and significantly reducing the cruising range of electric vehicle).

(3) Belt type CVT drive: This mode uses two V-grooved turntables to clamp a transmission belt therebetween, and changes the centrifugal force of the V-grooved turntables by changing the rotating speed of the motor; further the expected reduction ratio can be achieved by changing the diameter ratio between the V-grooved turntables. However, in order to prevent relative sliding between the transmission belt and the V-grooved turntables, the V-grooved turntables must clamp the transmission belt therebetween positively, however, keeping the V-grooved turntables to clamp the transmission belt positively will produce high frictional heat, resulting in substantial energy loss and reducing the cruising range of electric vehicle.

Further, in a fuel engine vehicle, a clutch and a gearbox are used to mate with a cylinder, a crank and a crank shaft for achieving an optimal driving effect and reducing fuel consumption. However, the fuel engine exhausts bad gases, causing air pollution.

Therefore, it is desirable to provide measures that eliminates emissions of pollutants, enhances motor efficiency, minimizes energy consumption and enhances endurance.

SUMMARY OF THE INVENTION

The present invention has been accomplished under the circumstances in view. The present invention further simplifies the structure of the patent application Ser. No. 15/227,063 filed by the inventor of the present application. In addition to removing the combustion components of the internal combustion engine such as the cylinder, the crank and the crankshaft of the original fuel engine, the present invention also removes the main drive shaft, the main drive gear and the clutch in the cited reference and uses a power input pulley to replace the power input gear, enabling the electric motor to drive the power input pully through a transmission belt, thereby achieving a streamlined structure, improving motor efficiency and endurance and reducing motor power consumption.

An electric motorcycle in accordance with the present invention comprises an electric motor, a transmission gear set and a gearbox. The transmission gear set is mounted in the housing of the gearbox with one end of a power input shaft thereof inserted through a middle block of the gearbox and mounted with a power input pulley. The electric motor is mounted on one side of the middle block of the gearbox outside the housing with a motor shaft thereof inserted through the middle block of the gearbox and mounted with a motor pulley. A transmission belt is mounted on the motor pulley and the power input pulley so that the electric motor can drive the transmission belt to rotate the power input shaft of the transmission gear set. Thus, through a gear shift pedal and a gear shift axle, a link coupled to one end of the gear shift axle drives an extension arm to move a gear-shifting disc, causing the gear-shifting disc to drive the fork shaft to produce shifting. The speed thus generated is outputted by an output shaft of the transmission gear set. During rotation of the output shaft, a speed output chain gear mounted on the output shaft is rotated with the output shaft to rotate the rear wheel of the electric motorcycle through a chain.

The inventor of the present application has learned from the experience of the implementation of the patent application Ser. No. 15/227,063 that the fuel engine has a large inertia of the crankshaft driven by the piston during the explosion, so the reaction time of acceleration and deceleration is long. If there is no control of the clutch, a flameout at engine start or a teething problem during running is easy to occur. The electric motorcycle does not have the problem of flameout at engine start, and the reaction time of the motor acceleration and deceleration is short. The electric motor of the present invention uses the transmission belt to rotate the power input shaft of the transmission gear set so that the drive power can be transmitted through the speed output chain gear and the chain to the rear wheel of the electric motorcycle. Therefore, the invention does not require a clutch. When shifting, operate the speed control knob of the electric motorcycle to slightly reduce the speed of the electric motor so as to reduce the torque load of the transmission gear set, then use the gear shift pedal to shift the gear forward or backward.

Further, the transmission between the electric motor and the power input shaft can be variously embodied. In an alternate form of the present invention, a chain gear is mounted on the motor shaft of the electric motor, a chain gear is mounted on the power input shaft, and a chain is coupled between the chain gear on the motor shaft and the chain gear on the power input shaft. In another alternate form of the present invention, a gear is mounted on the motor shaft of the electric motor, a gear is mounted on the power input shaft, and an intermediate gear is meshed between the gear on the motor shaft and the gear on the power input shaft to increase the center distance between the motor shaft and the power input shaft, thus, the motor can be prevented from interfering with the housing of the gearbox when it is mounted on the gearbox.

Other advantages and features of the present invention will be fully understood by reference to the following specification in conjunction with the accompanying drawings, in which like reference signs denote like components of structure.

DETAILED DESCRIPTION OF THE INVENTION

Referring to FIGS. 1-5, an electric motorcycle 6 with improved motor efficiency in accordance with a first embodiment of the present invention is shown. The electric motorcycle 6 comprises an electric motor 1, a transmission gear set 42 and a gearbox 4. The transmission gear set 42 is mounted in the housing 41 of the gearbox 4 with one end of a power input shaft 423 thereof inserted through a middle block 411 of the gearbox 4 and then mounted with a power input pulley 43. The electric motor 1 is mounted on one side of the middle block 411 of the gearbox 4 outside the housing 41 with a motor shaft 11 thereof inserted through the middle block 411 of the gearbox 4 and then mounted with a motor pulley 12. A transmission belt 2 is mounted on the motor pulley 12 and the power input pulley 43 so that the electric motor 1 can drive the transmission belt 2 to rotate the power input shaft 423 of the transmission gear set 42. Thus, through a gear shift pedal 5 and a gear shift axle 51, a link 52 coupled to one end of the gear shift axle 51 drives an extension arm 531 to move a gear-shifting disc 53, causing the gear-shifting disc 53 to drive the fork shaft 54 to produce shifting. The speed thus generated is outputted by an output shaft 422 of the transmission gear set 42. During rotation of the output shaft 422, a speed output chain gear 421 mounted on the output shaft 422 is rotated with the output shaft 422 to rotate the rear wheel 62 of the electric motorcycle 6 through a chain. The aforesaid link 52 has an axle hole 521 located at one end thereof and coupled to one end of the gear shift axle 51, and a coupling hole 522 located at an opposite end thereof and coupled to an outer end of the extension arm 531 of the gear-shifting disc 53. Further, the gear-shifting disc 53 has an axle hole 532 coupled to one end of the fork shaft 54 for controlling shifting. The gearbox 4 further comprises a side cover 412 coved on an outer side of the middle block 411 to facilitate maintenance and repair. The electric motorcycle 6 further comprises a battery 3 disposed at a front side of the saddle to provide the necessary working power supply.

Generally, the fuel engine has a large inertia of the crankshaft driven by the piston during the explosion, so the reaction time of acceleration and deceleration is long. If there is no control of the clutch, a flameout at engine start or a teething problem during running is easy to occur. The electric motorcycle does not have the problem of flameout at engine start, and the reaction time of the motor acceleration and deceleration is short. The electric motor 1 uses the transmission belt 2 to rotate the power input shaft 423 of the transmission gear set 42 so that the drive power can be transmitted through the speed output chain gear 421 and the chain to the rear wheel 62 of the electric motorcycle 6. Therefore, the invention does not require a clutch. When shifting, operate the speed control knob 61 of the electric motorcycle 6 to slightly reduce the speed of the electric motor 1 so as to reduce the torque load of the transmission gear set 42, then use the gear shift pedal 5 to shift the gear forward or backward.

Figure 1:
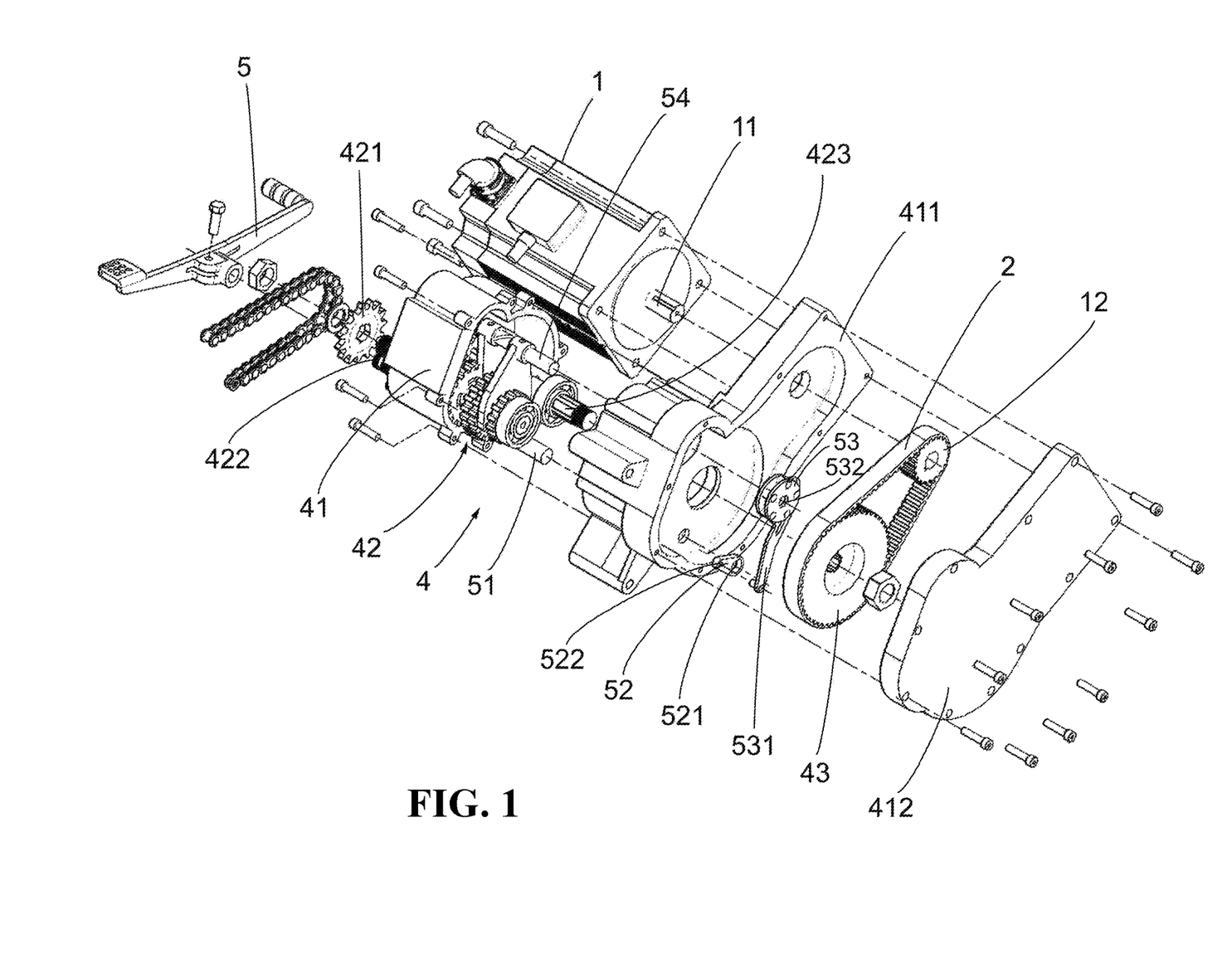
FIG. 1 is an exploded view of a power transmission system of an electric motorcycle in accordance with the present invention.
Figure 2:
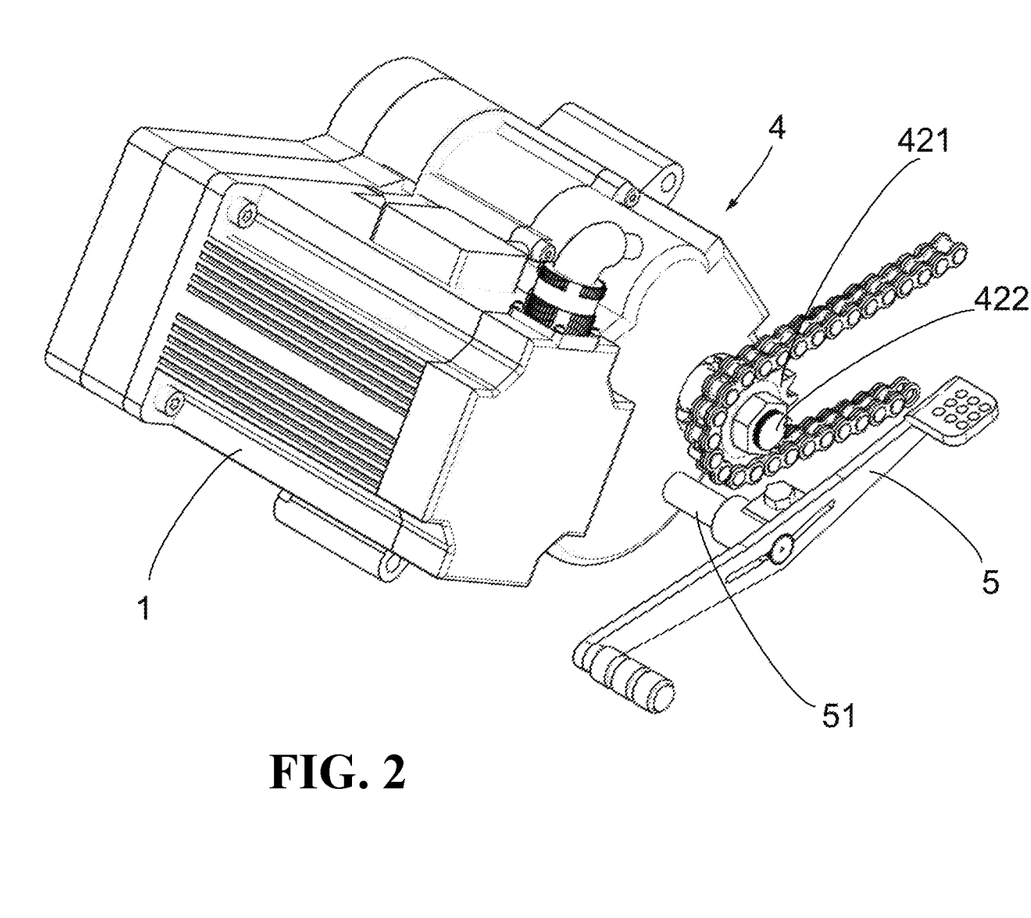
FIG. 2 is an elevational assembly view of the power transmission system of the electric motorcycle shown in FIG. 1.
Figure 3:
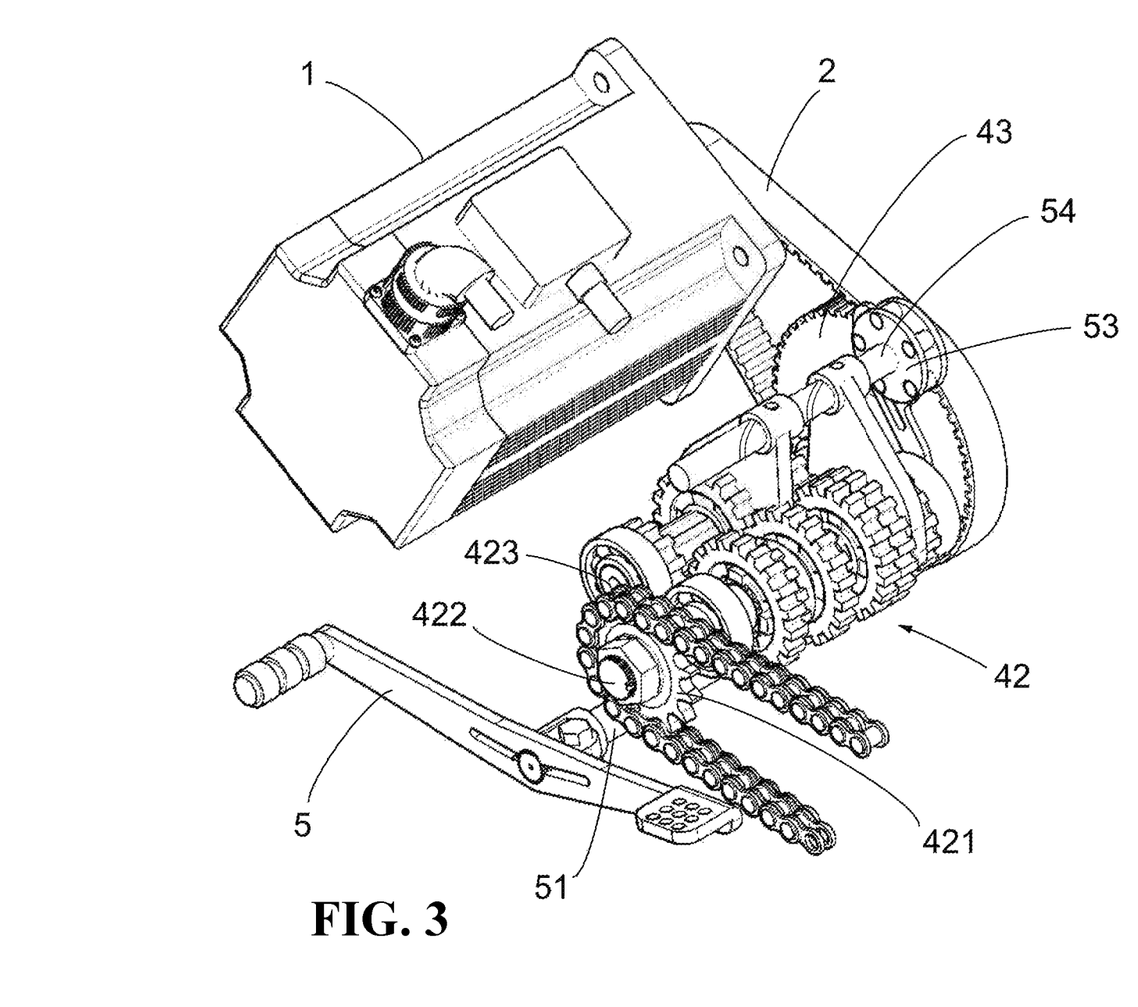
FIG. 3 illustrates the internal structure of the power transmission system shown in FIG. 2 after removal of the gearbox.
Figure 4:
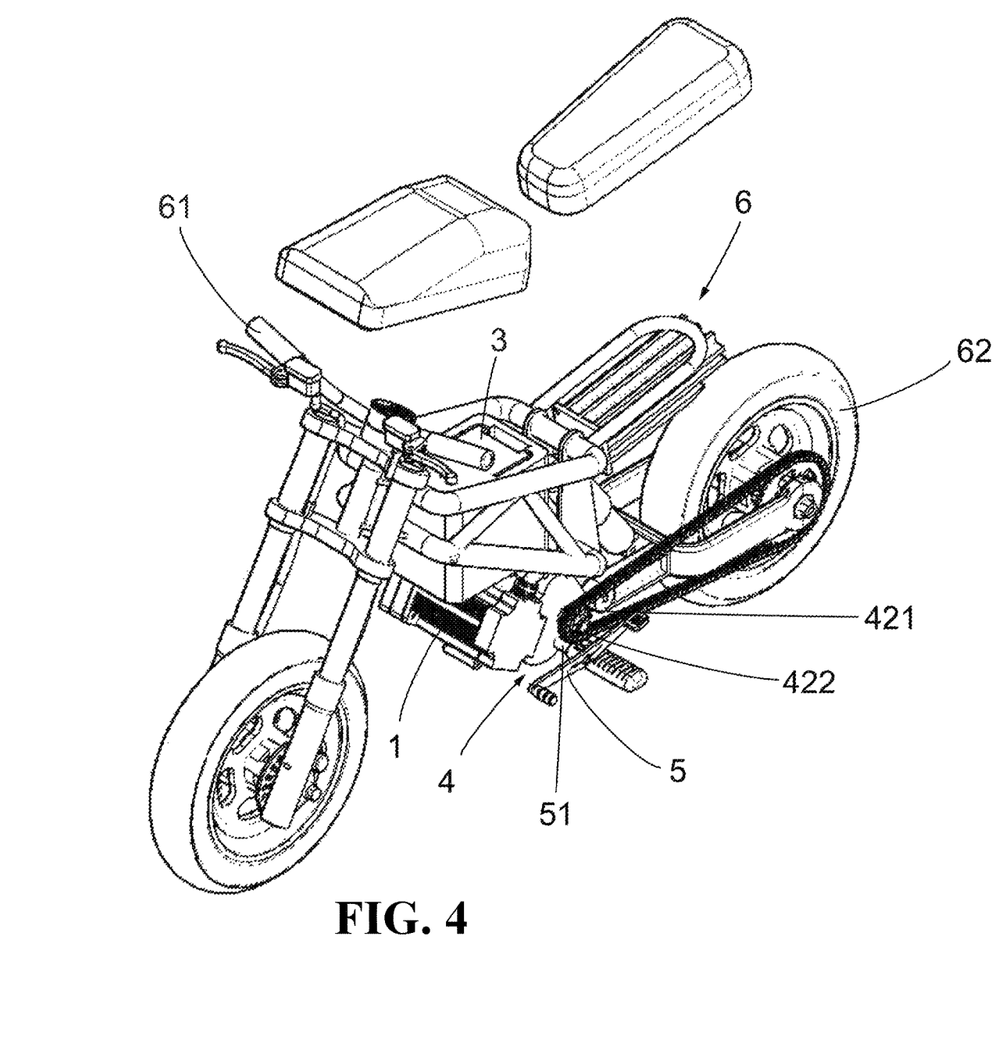
FIG. 4 is an exploded view of the electric motorcycle in accordance with the present invention.
Figure 5:
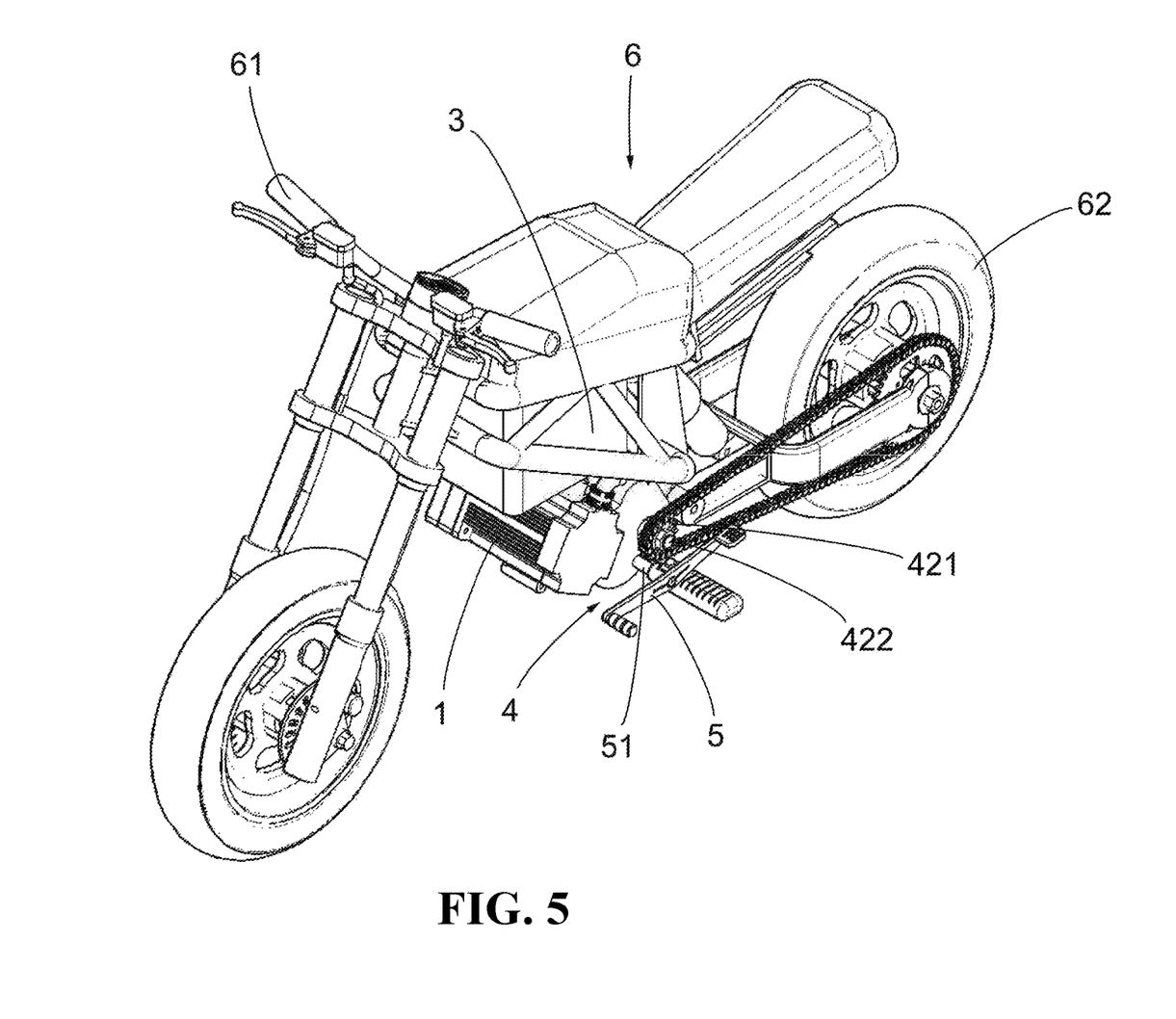
FIG. 5 is an elevational assembly view of FIG. 4.
Figure 6:
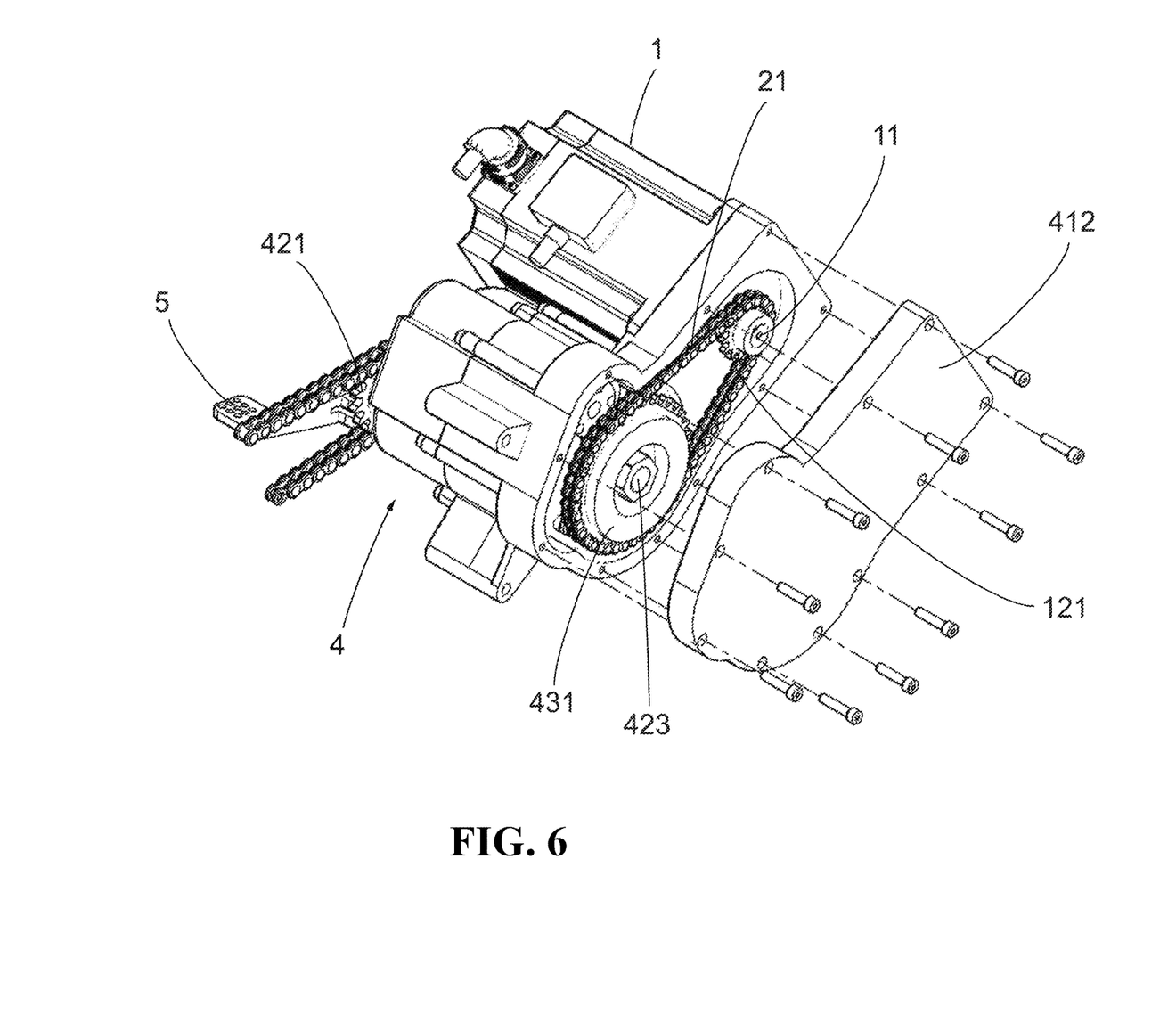
FIG. 6 is an exploded view of an alternate form of the power transmission system of the electric motorcycle in accordance with the present invention.
Figure 7:
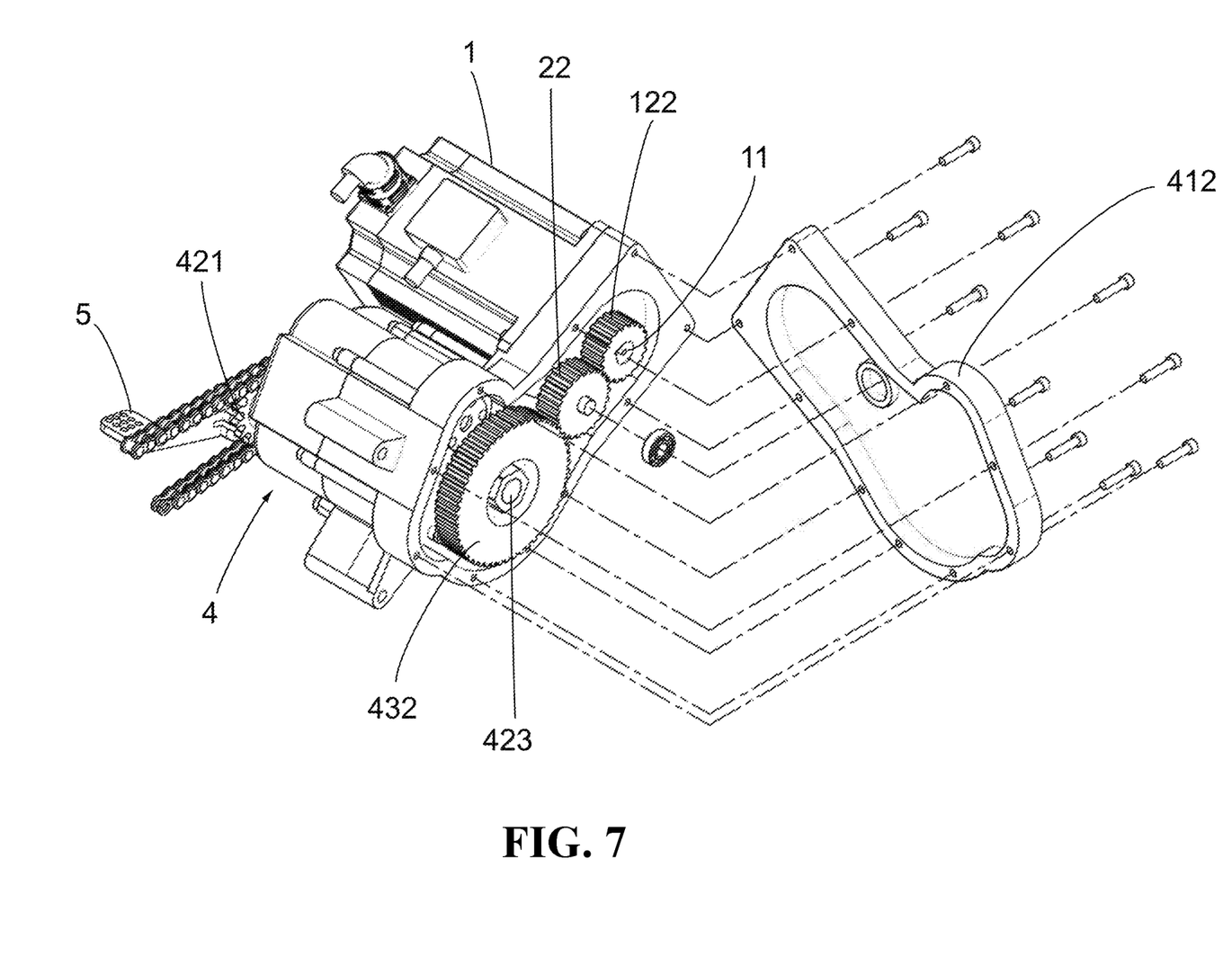
FIG. 7 is an exploded view of another alternate form of the power transmission system of the electric motorcycle in accordance with the present invention.

Further, the transmission between the electric motor 1 and the power input shaft 423 can be variously embodied. In an alternate form of the present invention, as shown in FIG. 6, a chain gear 121 is mounted on the motor shaft 11 of the electric motor 1, a chain gear 431 is mounted on the power input shaft 423, and a chain 21 is coupled between the chain gear 121 and the chain gear 431. In another alternate form of the present invention, as shown in FIG. 7, a gear 122 is mounted on the motor shaft 11 of the electric motor 1, a gear 432 is mounted on the power input shaft 423, and an intermediate gear 22 is meshed between the gear 122 and the gear 432 to increase the center distance between the motor shaft 11 and the power input shaft 423, thus, the motor 1 can be prevented from interfering with the housing 41 when it is mounted on the gearbox 4.

In summary, the present invention eliminates the problem of fuel engine pollution, uses its gearbox to enable the electric motor to achieve maximum efficiency and to reduce power consumption, has a very low failure rate, and can significantly increase the travel range.

What the invention claimed is:

1. An electric motorcycle, comprising:
a gearbox comprising a housing and a middle block mounted on said housing;
an electric motor comprising a motor shaft inserted through said middle block of said gearbox and a motor pulley fixedly mounted on said motor shaft;
a transmission gear set mounted in said housing of said gearbox, said transmission gear set comprising a power input shaft inserted through said middle block of said gearbox, a power input pulley fixedly mounted on said power input shaft and an output shaft rotatable upon rotation of said power input shaft;
a transmission belt coupled between said motor pulley of said electric motor and said power input pulley of said transmission gear set for enabling said electric motor to rotate said power input shaft of said transmission gear set;
a gear shift axle;
a gear shift pedal operable to rotate said gear shift axle;
an extension arm;
a link coupled between said gear shift axle and said extension arm;
a fork shaft for producing shifting; and
a gear-shifting disc driven by said link to drive said fork shaft to produce shifting; and
a speed output chain gear mounted on said output shaft of said transmission gear set and driven by said output shaft to rotate a rear wheel of the electric motorcycle through a chain.

2. The electric motorcycle as claimed in claim 1, wherein said gearbox further comprises a side cover coved on an outer side of said middle block.

3. The electric motorcycle as claimed in claim 1, further comprising a speed control knob for controlling the speed of said electric motor.

4. An electric motorcycle, comprising:
a gearbox comprising a housing and a middle block mounted on said housing;
an electric motor comprising a motor shaft inserted through said middle block of said gearbox and a chain gear fixedly mounted on said motor shaft;
a transmission gear set mounted in said housing of said gearbox, said transmission gear set comprising a power input shaft inserted through said middle block of said gearbox, a chain gear fixedly mounted on said power input shaft and an output shaft rotatable upon rotation of said power input shaft;
a chain coupled between said chain gear of said electric motor and said chain gear of said transmission gear set for enabling said electric motor to rotate said power input shaft of said transmission gear set;
a gear shift axle;
a gear shift pedal operable to rotate said gear shift axle;
an extension arm;
a link coupled between said gear shift axle and said extension arm;
a fork shaft for producing shifting; and
a gear-shifting disc driven by said link to drive said fork shaft to produce shifting; and
a speed output chain gear mounted on said output shaft of said transmission gear set and driven by said output shaft to rotate a rear wheel of the electric motorcycle through a second chain.

5. The electric motorcycle as claimed in claim 4, wherein said gearbox further comprises a side cover coved on an outer side of said middle block.

6. The electric motorcycle as claimed in claim 4, further comprising a speed control knob for controlling the speed of said electric motor.

7. An electric motorcycle, comprising:
a gearbox comprising a housing and a middle block mounted on said housing;
an electric motor comprising a motor shaft inserted through said middle block of said gearbox and a chain gear fixedly mounted on said motor shaft;
a transmission gear set mounted in said housing of said gearbox, said transmission gear set comprising a power input shaft inserted through said middle block of said gearbox, a chain gear fixedly mounted on said power input shaft and rotatable by said chain gear of said electric motor and an output shaft rotatable upon rotation of said power input shaft;
a chain coupled between said chain gear of said electric motor and said chain gear of said transmission gear set for enabling said electric motor to rotate said power input shaft of said transmission gear set;
a gear shift axle;
a gear shift pedal operable to rotate said gear shift axle;
an extension arm;
a link coupled between said gear shift axle and said extension arm;
a fork shaft for producing shifting; and
a gear-shifting disc driven by said link to drive said fork shaft to produce shifting; and
a speed output chain gear mounted on said output shaft of said transmission gear set and driven by said output shaft to rotate a rear wheel of the electric motorcycle through a second chain.

8. The electric motorcycle as claimed in claim 7, wherein said gearbox further comprises a side cover coved on an outer side of said middle block.

9. The electric motorcycle as claimed in claim 7, further comprising a speed control knob for controlling the speed of said electric motor.

* * * * *